United States Patent [19]

Ishikawa et al.

[11] Patent Number: 5,214,636
[45] Date of Patent: May 25, 1993

[54] OPTICAL RECORDING ELEMENT HAVING A PLURALITY OF THIN FILM FILTERING LAYERS AND OPTICAL RECORDING ELEMENT HAVING AN ELECTRICALLY CONDUCTIVE LAYER

[75] Inventors: Toshio Ishikawa; Hiroyuki Katayama; Kazuo Van, all of Nara; Tomoyuki Miyake, Tenri; Junichiro Nakayama; Kenji Ohta, both of Nara; Hideyoshi Yamaoka, Matsubara, all of Japan

[73] Assignee: Sharp Kabushiki Kaisha, Osaka, Japan

[21] Appl. No.: 421,757

[22] Filed: Oct. 16, 1989

[30] Foreign Application Priority Data

Oct. 21, 1988 [JP] Japan .................. 63-266427
Nov. 30, 1988 [JP] Japan .................. 63-157133[U]

[51] Int. Cl.⁵ .................................................. G11B 3/70
[52] U.S. Cl. ..................................... 369/286; 369/283
[58] Field of Search ............... 369/280, 282, 284, 286, 369/288, 275.1, 275.2, 275.3, 275.4; 346/135.1, 76 L

[56] References Cited

FOREIGN PATENT DOCUMENTS

| | | | |
|---|---|---|---|
| 2479526 | 10/1981 | France . | |
| 56-16948 | 2/1981 | Japan | 369/284 |
| 56-19530 | 2/1981 | Japan . | |
| 57-63291 | 4/1982 | Japan . | |
| 58-200447 | 11/1983 | Japan | 369/284 |
| 59-79445 | 5/1984 | Japan . | |
| 59-124046 | 7/1984 | Japan . | |
| 59-217244 | 12/1984 | Japan | 369/283 |
| 61-133058 | 6/1986 | Japan | 369/283 |
| 61-242570 | 8/1986 | Japan | 369/283 |
| 193931 | 9/1986 | Japan | 369/283 |
| 62-86555 | 4/1987 | Japan | 369/284 |
| 62-210975 | 6/1987 | Japan | 369/284 |
| 62-148904 | 7/1987 | Japan . | |
| 62-167637 | 7/1987 | Japan . | |
| 62-257646 | 11/1987 | Japan | 369/283 |
| 62-270041 | 11/1987 | Japan | 369/283 |
| 62-360370 | 11/1987 | Japan | 369/283 |
| 63-69044 | 3/1988 | Japan . | |
| 63-348431 | 5/1988 | Japan | 369/283 |
| 63-300442 | 12/1988 | Japan | 369/283 |

Primary Examiner—Eugene R. LaRoche
Assistant Examiner—Tan Nguyen

[57] ABSTRACT

An optical recording element according to the present invention comprising: (i) a transparent substrate through which light passes; (ii) a transparent low-resistance layer having a specific resistance so as to prevent the adhesion of dust to the surface of the element caused by a static charge, the layer being formed on the surface, on which a light beam is incident, of the transparent substrate; and (iii) an optical thin film composed of at least one layer, formed on the other surface of the transparent substrate so as to transmit light beams used for recording, erasing and playback, and reflect lights which have wavelengths different from the wavelength of the above light beams and are within a specified visible region of the spectrum. With this arrangement, lights within a specified visible region of the spectrum are reflected so that the element appears to be colored according to the wavelengths of the reflected lights. Also, a problem often found in a conventional optical recording element having a transparent substrate of a resin material that the surface of the element is hardened by a light beam, can be solved. Even if a static charge is generated on the surface of such an element, the conductive transparent low-resistance substrate can eliminate the static charge outward whereby a static charge is less likely to be accumulated and the surface can be kept clean in order to improve the reliability.

26 Claims, 5 Drawing Sheets

OPTICAL RECORDING ELEMENT HAVING A PLURALITY OF THIN FILM FILTERING LAYERS AND OPTICAL RECORDING ELEMENT HAVING AN ELECTRICALLY CONDUCTIVE LAYER

FIELD OF THE INVENTION

The present invention relates to an optical recording element for use in optically recording, erasing and playing back information from optical disks, optical memory cards and the like.

BACKGROUND OF THE INVENTION

While there has been an increasing need for high density memory systems capable of storing large amounts of information and accessible at high speeds optical recording elements capable of optically recording, erasing and playing back information have begun to attract attention. Research and development especially aimed at improving DRAW (Direct Read After Write) type optical disks, rewritable optical disks and portable memory cards are expedited in order to find wide applications for the optical recording elements.

Conventionally, a multiple-layer construction having anti-reflection properties is widely employed in such optical recording elements. With reference to FIGS. 5(a)-5(c), optical recording elements of multiple-layer construction, are known and including (i) optical recording elements comprising a recording medium 20 formed on one face of a transparent substrate 14, the recording medium 20 including a recording layer 11, transparent dielectrical layer 12 and reflective film layer 13 (see FIG. 5(a)); (ii) optical recording elements comprising a recording medium 21 dormed on one face of the transparent substrate 14, the recording medium 21 including two transparent dielectric layers 15 and 16, and the recording layer 11 (see FIG. 5(b)); and (iii) optical recording elements comprising a recording medium 22 formed on one face of the transparent substrate 14, the recording medium 22 including two transparent dieletric layers 17 and 18, the recording layer 11, and the reflective film layer 13 (see FIG. 5(c)). These types of optical recording elements have anti-reflection properties exhibited by the interference effect of the transparent dielectric layers 12, 15, 16, 17 and 18, respectively.

In DRAW type optical recording elements, e.g. punching type optical recording elements, the anti-reflection properties acheived by the multiple-layer construction is essential for enhancing the contrast in the reproduced information and obtaining high recording sensitivity. Also, the above anti-reflection properties are required in a magneto-optical recording element, in order to improve the element's playback performance by enhancing the magneto-optical effects.

The aforesaid transparent substrate 14 is made of a plastic such as polycarbonate resin, glass ot the like. In particular, it is possible to economically produce large quantities of the substrates 14 made of a plastic at low cost by injection molding or similar methods, and therefore such substrates 14 are widely used. The recording layer 11 is comprised of, for example, an amorphous rare earth-transition metal thin film such as GdTbFe which is suitable for magneto-optical recording.

Although the recording and playback performances of the optical recording elements can be improved by the conventional constructions, the amount of reflected light from the recording layer 11 is inevitably decreased since it is required to effectively cause the interference of light at the abovementioned transparent dieletric layers 12, 15, 16, 17 and 18. Therefore, the optical recording element having any of the above constructions has a dark tone appearance, and shows up badly in comparison with disks in which a material having metalic luster is used for obtaining a high reflective factor such as compact disks and video disks for playback use only; and magnetic cards having a colorful design provided thereon such as cash cards, credit cards and various prepaid cards.

The transparent substrate 14 composing the conventional optical recording element tends to generate a static charge, as apparent from the fact that the optical recording element having the transparent substrate 14 of polycarbonate resin shows a specific resistance of approximately $1 \times 10^{16}$ $\Omega \cdot$ cm on the surface thereof. Since the surface of the transparent substrate 14 easily gets dust because of the static charge, noise is generated deteriorating the reliability of the optical recording element.

SUMMARY OF THE INVENTION

It is an object of the present invention to provide an optical recording element in which a reflective material is used for reflecting lights having wavelengths in a specified visible region of the spectrum, in order to make the appearance of the optical recording element colorful.

It is another object of the present invention to provide an optical recording element having improved reliability with the surface which is not hardened even if it comprises a transparent substrate made of a resin material.

It is still another object of the present invention to provide an optical recording element capable of eliminating a static charge generated on the surface thereof in order to prevent the adhesion of dust to the surface, thereby increasing the reliability of the optical recording element.

In order to achieve the above objects, an optical recording element according to the present invention is characterized in comprising: (i) a transparent substrate through which light passes; (ii) a recording medium formed on one face of the transparent substrate; and (iii) an optical thin film composed of at least one layer, formed on the other face of the transparent substrate so as to transmit light beams used for recording, erasing and playback, and reflect lights which have wavelengths different from the wavelength of the above light beams and are within a specified visible region of the spectrum. With the above arrangement, lights having wavelengths in a specified visible region of the spectrum are reflected at the surface of the optical recording element so that the surface appears to be colored according to the wavelengths of the reflected lights, and the disadvantage of a dark appearance can be thus overcome. On the other hand, light beams used for the recording, erasing and playback of information pass through the optical recording element, and therefore there is no fear of damaging the functions of recording, erasing and playback.

In order to achieve the above objects, another optical recording element according to the present invention is characterized in comprising: (i) a transparent low-resistance substrate having a specific resistance at the surface thereof in the range from more than 0 $\Omega \cdot$cm to $1 \times 10^6$ Ω·cm; (ii) a recording medium formed on one face of the transparent low-resistance substrate, the face being opposite to the side on which a light beam is incident; and (iii) a protective layer formed on one face of the recording medium, the face being opposite to the side at which the transparent low-resistance substrate is formed.

Having a low specific resistance, i.e., $1 \times 10^6$ Ω·cm or less, the transparent low-resistance substrate in the above arrangement is electrically conductive. More specifically, when a static charge is generated on the optical recording element, the transparent low-resistance substrate can transmit the static charge outward thereby to prevent the accumulation of static charges and the adhesion of dust to the surface of the transparent low-resistance substrate. Consequently, noise can be reduced.

This specification also discloses the manufacturing method of the optical recording element having a low specific resistance at the surface thereof.

The above and other objects of the present invention will become more apparent from the following description when taken in conjunction with the accompanying drawings.

BRIEF DESCRIPTION OF THE DRAWINGS

FIG. 1 is a sectional view of the essential parts of an optical recording element according to the present invention.

FIG. 2 is a graph showing the dependence of the reflectivity on the wavelength at the optical recording element in the respective cases the optical recording element has a transparent dielectric thin film laminated layer of bi-layer construction and it has a transparent dielectric thin film laminated layer of quadri-layer construction.

FIG. 3 is a graph showing the dependence of the reflectivity on the wavelength at the surface of the optical recording element having a transparent dielectric thin film laminated layer of the quadri-layer construction when the only thickness of a low refractive index dielectric thin film is changed more or less from the value of the thickness thereof obtained by the equation (1).

DESCRIPTION OF THE EMBODIMENTS

Figure 1:
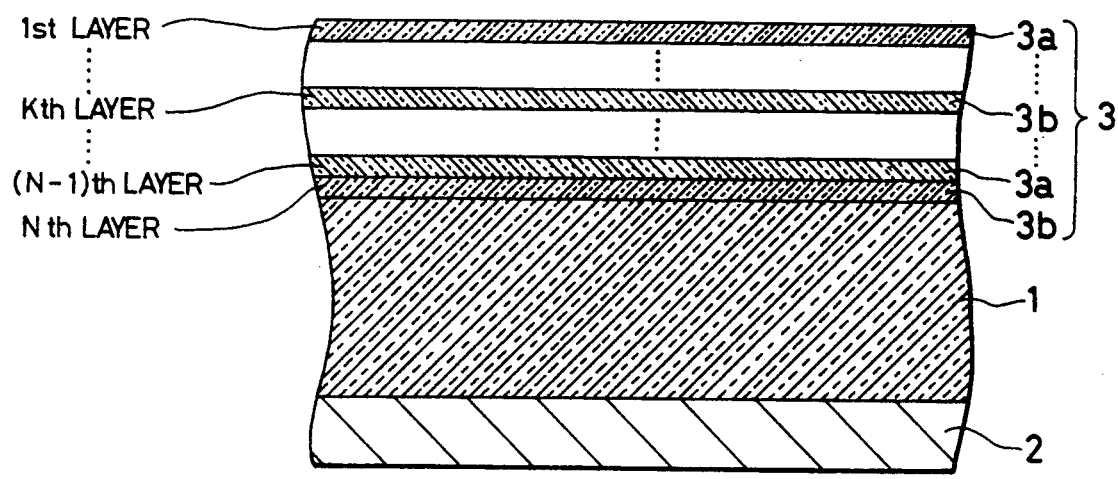
FIGS. 1 to 3 respectively show one embodiment of the present invention.
Figure 2:
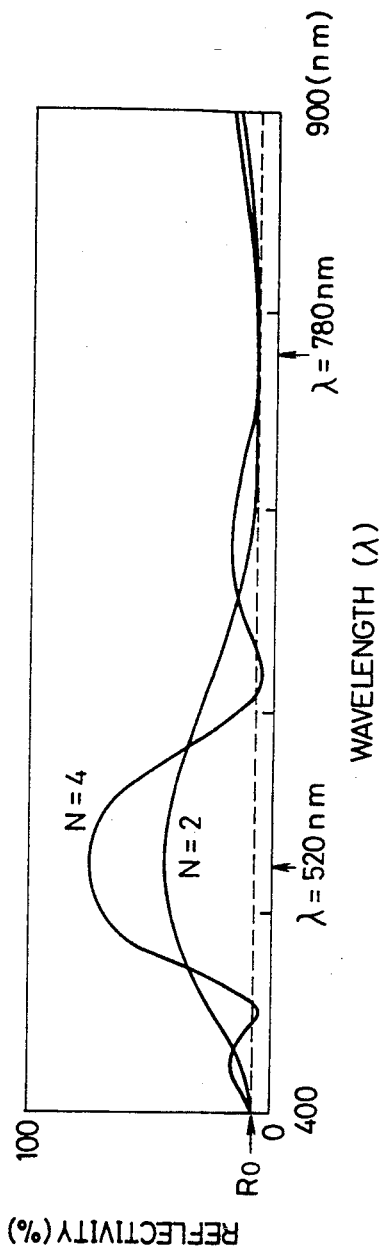
Figure 3:
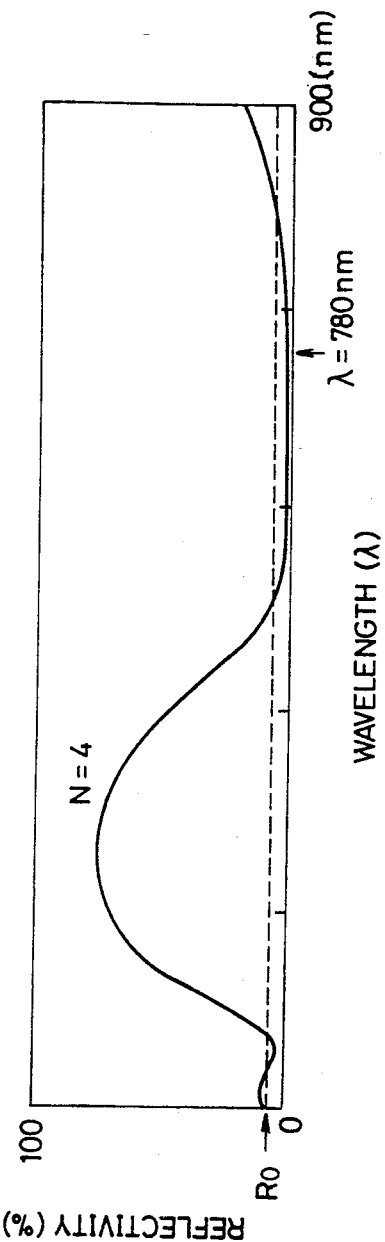

Referring to FIGS. 1 to 3, one embodiment of the present invention will be hereinafter described in detail.

The optical recording element of the present invention, as shown in FIG. 1, comprises a transparent substrate 1 through which light beams utilized for the recording, erasing, playback of information pass; recording medium 2 formed on one face of the transparent substrate 1; and transparent dielectric thin film laminated layer 3 formed on the other face of the transparent substrate 1. Like conventional optical recording elements, the recording medium 2 has a construction for anti-reflection, in which transparent dielectric layers, a reflective film layer and a recording layer are formed in combination.

The transparent dielectric thin film laminated layer 3 includes high refractive index dielectric thin films 3a which are optical thin films having a refractive index higher than that of the transparent substrate 1, and low refractive index dielectric thin films 3b having a refractive index lower than that of the transparent substrate 1. These high refractive index dielectric thin films 3a and low refractive index dielectric thin films 3b are alternately laminated forming N layers, such that the first layer, as viewed from the side on which light beams used for the recording, erasing and playback are incident, is the high refractive index dielectric thin film 3a. Accordingly, the high refractive index dielectric thin film 3a is formed at the odd layers and the low refractive index dielectric thin film 3b at the even layers. The thicknesses of the high refractive index dielectric thin film 3a and the low refractive index dielectric thin film 3b are respectively given by:

$$n_k d_k = \frac{\lambda}{2^m} \quad (m = 1, 2, 3 \ldots) \quad (1)$$

where
$n_k$: the refractive index of the k-th transparent dielectric thin film as counted from the side on which a light beam is incident.
$d_k$: the thickness of the k-th transparent dielectric thin film.
$\lambda$: the wavelength of light beams used for recording, erasing and playing back information.

With the above arrangement, due to the interference effect of the multiple-layers, the reflectivity of the optical recording element of multiple-layer construction is equivalent to that of the optical recording element wherein neither the high refractive index dielectric thin film 3a nor low refractive index dielectric thin film 3b are provided. The reflectivity for the incident light beam of the wavelength $\lambda$ is the minimum value. In other words, the amount of reflected light becomes large when light having other wavelengths than the above wavelength $\lambda$ is incident on the optical recording element, and therefore the optical recording element has colors corresponding to the wavelengths of the reflected light.

More concretely, when employing ZnS (the refractive index n=2.39) as the high refractive index dielectric thin film 3a; $MgF_2$ (the refractive index n=1.39) as the low refractive index dielectric thin film 3b; polycarbonate (the refractive index n=1.585) as the transparent substrate 1, and setting the wavelength $\lambda$ of the light beams used for recording, erasing and playback to 780 nm, the thicknesses of the ZnS layer and $MgF_2$ layer are respectively obtained using the above equation (1). The thickness $t_{zns}$ of the ZnS layer and the thickness $t_{MgF_2}$ of the $MgF_2$ layer are approximately 163 nm and 281 nm respectively. Under the above condition, the dependence of the reflectivity on the wavelength at the surface of the optical recording element is observed in the respective cases that the transparent dielectric thin film laminated layer 3 is composed of two layers (i.e. in the case of N=2 in FIG. 1) and composed of four layers (i.e. in the case of N=4 in FIG. 1). As shown in FIG. 2, in both cases, the as shown reflectivity is the minimum value $R_0$ at the wavelength of 780 nm, and is high at the wavelength which is in the vicinity of 520 nm (the reflectivity of the optical recording element having no transparent dielectric thin film is also the value $R_0$ at the wavelength of 780 nm). Hence, the light beams used for recording, erasing and playback pass through the transparent substrate 1 without being reflected so as to reach the recording film, while lights (in this case, the lights whose wavelength is in the vicinity of 520 nm) having other wavelengths than that of the above light beams do not pass through the transparent substrate 1 but are reflected thereat. As a result, an optical recording element whose appearance is in yellow tone can be obtained without damaging the recording, erasing and playback functions of the optical recording element. It often occurs that the surface of the transparent substrate 1 is hardened by incident light beams, when the transparent substrate 1 is of a resin material, but such a drawback can be avoided in this embodiment wherein an inorganic transparent dielectric thin film is laminated on the surface of the transparent substrate 1.

When the thickness of the $MgF_2$ layer serving as the low refractive index dielectric thin film $3b$ more or less differs from the value obtained by the foregoing equation (1) (e.g. $t_{MgF2}=100$ nm) and the transparent dielectric thin film laminated layer 3 is of quadari-layer construction (i.e. in the case of N=4 in FIG. 1), the dependence of the reflectivity on the wavelength at the surface of the optical recording element is observed. As shown in FIG. 3, not only is the wavelength region at which the reflectivity of the optical recording element is high wider compared with that in the first example shown in FIG. 2, but the reflectivity at the wavelength of 780 nm is lower than the minimum value $R_0$. Therefore, the adverse influence of light reflected at the surface of the optical recording element in the course of recording, erasing or playback operation can be reduced.

In the above examples, transparent dielectric thin films which are optical thin films are laminated to form a multiple-layer construction, whereby the light beams used for recording, erasing and playback pass therethrough due to the interference effect, while lights having wavelengths within a specified visible region of the spectrum, different from the wavelength of the above light beams are reflected thereat. In lieu of the aforesaid transparent dielectric thin film of multiple-layer construction, a single optical thin film of mono-layer construction may be employed. Also, it is to be understood that the transparent dielectric thin film laminated layer 3 is not limited only to the alternate layers of ZnS and $MgF_2$, but other materials may be employed in combination selecting from materials such as $Sb_2S_3$, $TiO_2$, CdS, $CeO_2$, $PbCl_2$, $WO_3$, SiO, $Al_2O_3$, $SiO_2$, $CaF_2$, LiF, NaF, AlN, SiN, etc. so as to satisfy the aforementioned relation between two materials regarding the refractive index. Further, in the foregoing embodiment, the transparent substrate 1 is provided with the transparent dielectric thin film laminated layer 3 at the surface opposite to the surface on which the recording medium 2 is formed, but it also may be positioned between the transparent substrate 1 and the recording medium 2 for example.

Figure 6:
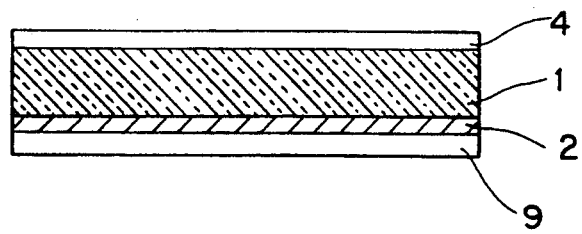
FIG. 6 is directed a further preferred embodiment of the invention having a protective layer disposed on one side of the optical recording element.

In the case of a conventional optical recording element having the transparent substrate made of polycarbonate resin or the like, the specific resistance at the surface of the transparent substrate is very high i.e. $1\times 10^{16}\Omega\cdot cm$ and therefore a static charge is likely to be generated, causing dust to adhere to the surface thereof. This is one of the reasons for deteriorating the reliability of the optical recording element. In order to overcome such a drawback, another optical recording element according to the present invention, as shown in FIG. 6 comprises (i) the transparent substrate 1; (ii) the recording medium 2 formed on one face of the transparent substrate 1; (iii) a protective layer 9 for protecting the recording medium 2, formed on the surface of the recording medium 2, the surface being opposite to the side at which the transparent substrate 1 is formed; and (iv) a coating layer 4 formed on the other face (on which a light beam is incident) of the transparent substrate 1. Incidentally, in this embodiment, parts that are substantially equivalent or function substantially similarly to those in the first embodiment are indicated by the same reference numerals for convenience of explanation and the description thereof is omitted.

The material of the transparent substrate 1 is not limited, but any material so long as it is light-permeable like plastics such as polycarbonate resin, and glass. The recording medium 2 may have at least one of functions such as optical recording, playback and erasing operation. The coating layer 4 comprises a transparent conductive coating of a transition element oxide such as $SnO_2$, $In_2O_3$ and CdO, and is 50 to 600 nm in thickness. This coating layer 4 permits the transparent low-resistance substrate 5 composed of the transparent substrate 1 and the coating layer 4 to have a specific resistance of $1\times 10^6 \Omega\cdot cm$ or less which is lower compared with the case in which no coating layer 4 is provided. In the case of the optical recording element having the construction shown in FIG. 1, the coating layer 4 may be formed on the face of the transparent dielectric thin film laminated layer 3, the face on which a light beam is incident. In the case of the optical recording element having the transparent dielectric thin film laminated layer 3 (shown in FIG. 1) formed between the transparent substrate 1 and the recording medium 2, the coating layer 4 may be formed on the face of the transparent substrate 1, the face on which a light beam is incident.

The following description describes the manufacturing method of the optical recording element having the coating layer 4.

For producing the optical recording element, the coating layer 4 of $SnO_2$ or the like having a thickness of about 100 nm is deposited on one face of the transparent substrate 1 made of polycarbonate resin (or the transparent dielectric thin film laminated layer 3) by means of sputtering or other method. Then, the other face of the transparent substrate 1 is provided with the recording medium 2 composed of an amorphous rare earth-transition metal thin film such as GdTbFe and the protective layer 9 is further covered thereon.

The method for forming the coating layer 4 is not limited to the sputtering but may be a heat decomposition method for instance, so long as the coating layer 4 having a thickness from 50 nm to 600 nm can be obtained with it. Also, the coating layer 4 may be formed after depositing the recording medium 2 and the protective layer 9.

As described above, since the transparent low-resistance substrate 5 comprises the coating layer 4 formed on one face of the transparent substrate 1, the coating layer 4 being composed of the transparent conductive coating, and the specific resistance at the surface of the transparent low-resistance substrate 5 is not more than $1 \times 10^6 \Omega \cdot cm$, even if a static charge is generated on the optical recording element, the static charge will be eliminated outward by the transparent low-resistance substrate 5. Accordingly, the optical recording element is less likely to generate a static charge and get dust. As a result, the surface of the transparent low-resistance substrate 5 can be kept clean, thereby reducing noise to be generated when recording, playing back or erasing information.

In this embodiment, the transparent low-resistance substrate 5 comprises the transparent substrate 1 and the coating layer 4 composed of the transparent conductive coating, the coating layer 4 being formed on the transparent substrate 1, but the transparent low-resistance substrate 5 is not limited to the above construction. It may be composed of conductive glass which contains $V_2O_3$, $WO_3$, $MoO_3$, $TiO_2$, $Fe_2O_3$ or others. More specifically, the noise can be reduced so long as the transparent low-resistance substrate 5 is light permeable and the specific resistance at the surface thereof is in the range from more than $0\Omega \cdot cm$ to $1 \times 10^6 \Omega \cdot cm$.

Figure 7:
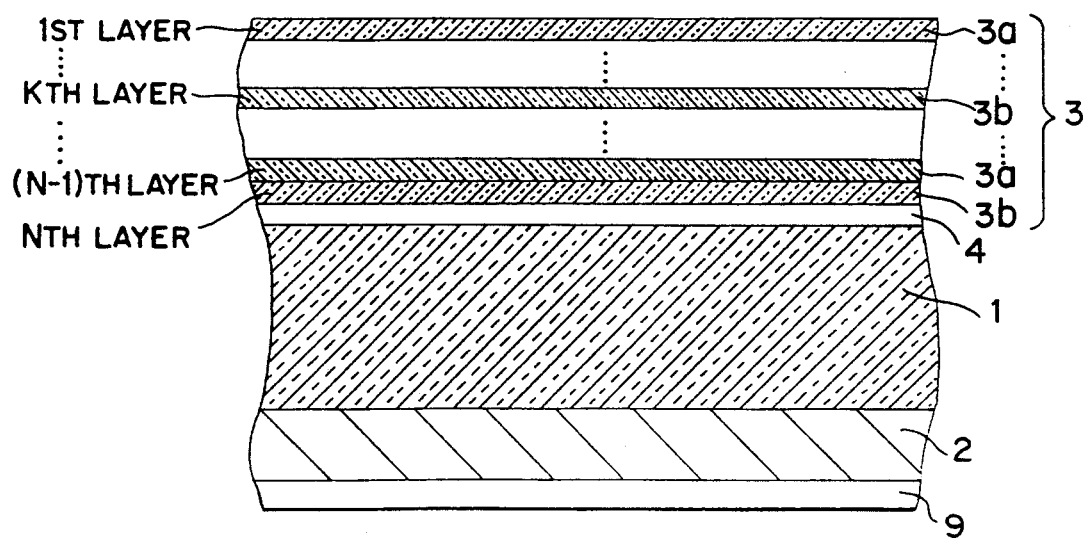
FIG. 7 is directed another preferred embodiment of the invention having protective layers disposed in the optical recording element.

FIG. 7 shows the optical recording element of FIGS. 1 and 6 having a combination of protective layers 4 and 9. A first protective layer 4 is disposed between the plurality of dielectric layers 3 and the substrate 1. The protective layer 4 protects the transparent substrate 1 from light which passes through the plurality of dielectric layers and is incident upon the surface fo the transparent substrate 1. The second protective layer 9 prevents against the adhesion of dust on the surface of the recording layer due to static electricity. Both protective layers and the basic structure of the optical recording element have previously been discussed with respect to FIGS. 1 and 6.

As mentioned above, the optical recording element of the present invention is characterized in comprising: (i) a transparent substrate through which light passes; (ii) a recording medium formed on one face of the transparent substrate; and (iii) an optical thin film composed of at least one layer, formed on the other face of the transparent substrate so as to transmit light beams used for recording, erasing and playback, and reflect lights which have wavelengths different from the wavelength of the above light beams and are within a specified visible region of the spectrum. With the above arrangement, lights within a specified visible region of the spectrum are reflected, whereby the optical recording element appears to be colored according to the wavelengths of the reflected lights and the disadvantage of a dark appearance can be eliminated. Furthermore, such a problem in an optical recording element having a transparent substrate made of a resin material that the surface of the optical recording element is hardened by light beams, can be overcome.

Figure 4:
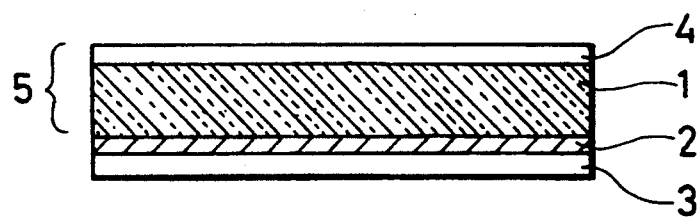
FIG. 4 is a vertical sectional view showing the structure of an optical recording element according to another embodiment, which has a low specific resistance.
Figure 5C:
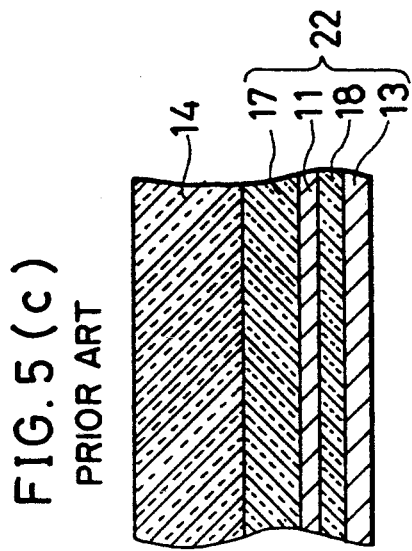
FIGS. 5(a) to (c) are sectional views respectively showing the multiple-layer construction of a prior art optical recording element.
Figure 5A:
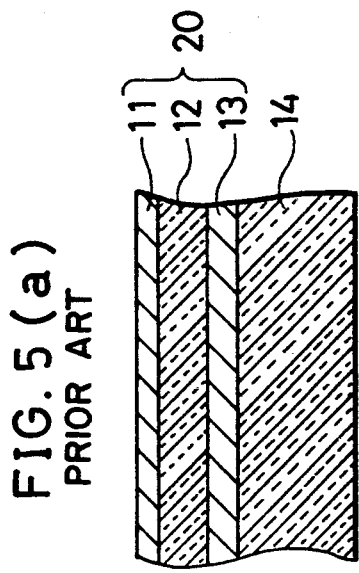
Figure 5B:
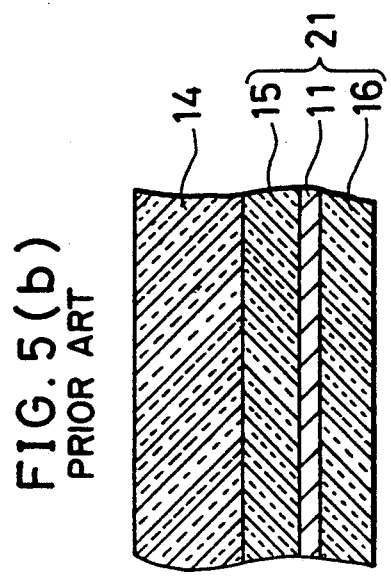

Another optical recording element of the present invention comprises: (i) a transparent low-resistance substrate having a specified resistance at the surface thereof in the range from more than $0\Omega \cdot cm$ to $1 \times 10^6 \Omega \cdot cm$; (ii) a recording medium formed on one face of the transparent low-resistance substrate, the face being opposite to the side on which a light beam is incident; and (iii) a protective layer formed on one face of the recording medium, the face being opposite to the side on which the transparent low-resistance substrate formed. In such an arrangement, even if a static charge is generated on the optical recording element, the static charge can be eliminated out of the optical recording element by the transparent low-resistance substrate which is conductive. Accordingly, the optical recording element is less likely to generate a static charge thereon and get dust. Consequently, the surface of the transparent low-resistance substrate can be kept clean, thereby to reduce noise generated when recording, playing back and erasing information and improve the reliability thereof. FIGS. 4, 6 and 7 show embodiments of the present invention with like numerals representing the same elements in the previously described figures.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical recording element comprising:
    a transparent substrate through which light beams pass, having a first surface and a second surface;
    a recording layer for recording erasing and playback of information from a plurality of light beams located on said first surface;
    a transparent low resistance layer having an internal surface and an exposed surface, wherein said layer having a specific resistance prevents dust from adhering to the exposed surface of the layer caused by a static charge, the layer being formed on said recording layer on th first surface of said transparent substrate, on which a light beam is incident; and
    an optical thin film composed of at least one layer, formed on the second surface of said transparent substrate having an effective refractive index for transmitting light beams projected from a side of the optical thin film used for the recording, erasing and playback of information and also for reflecting light beams, the reflected light beams having wavelengths different from wavelengths of the light beams used for recording, erasing or playback of information to provide a colorful appearance of the optical recording element.

2. An optical recording element according to claim 1, wherein said transparent substrate is made of glass.

3. An optical recording element comprising:
    a transparent substrate through which light beams pass, having a first surface and second surface;
    a recording medium formed on said first surface of said transparent substrate; and
    an optical thin film composed of at least one layer, formed on said second surface of said transparent substrate for transmitting light beams used for the recording, erasing and playback of information, and also for reflecting light beams, the reflected light beams having wavelengths different from wavelengths of the light beams used for recording, erasing or playback of information to improve the appearance of the optical recording element;
    wherein said optical thin film further comprises a first thin film having a higher refractive index than that of said transparent substrate and a second thin film having a lower refractive index than that of said transparent substrate, said first and second thin films being alternately laminated.

4. An optical recording element according to claim 3, wherein the first and second thin films are respectively comprised of transparent dielectric thin films.

5. A optical recording element according to claim 3, wherein the respective indices of refraction of first second thin films and th thickness of said thin films being a function of an integral multiple of a half-wavelength of a light beam.

6. An optical recording element according to claim 3, wherein the first thin film is made of ZnS and the second thin film is made of $MgF_2$.

7. An optical recording element according to claim 2, wherein the first and second thin films are respectively made of a combination of inorganic transparent dielectric materials, having refractive indices both lower and higher than said transparent substrate and composed of the group consisting of sulfide such as $Sb_2S_3$ and CdS; oxide such as $TiO_2$, $CeO_2$, $WO_3$, $SiO_2$, $Al_2O_3$ and $SiO_2$; fluoride such as $CaF_2$, LiF and NaF; nitride such as SiN and AlN; chloride such as $PbCl_2$.

8. An optical recording element according to claim 3, wherein said transparent substrate is made of glass.

9. An optical recording element according to claim 3, wherein said transparent substrate is made of plastic.

10. An optical recording element according to claim 9, wherein said plastic is made of polycarbonate resin.

11. An optical recording element comprising:
transparent substrate through which light beams pass, having a first surface and a second surface;
a recording layer for recording erasing and playback of information from a plurality of light beams formed on said first surface;
a transparent low-resistance layer having an internal surface and an exposed surface, wherein said layer having a specific resistance for preventing dust from adhering to the exposed surface of the layer caused by a static charge, the layer being formed on said recording layer on the first surface of said transparent substrate, on which a beam is incident;
an optical thin film composed of at least one layer, formed on the second surface of said transparent substrate for transmitting light beams projected from both sides of the optical film used for the recording, erasing and playback of information on said recording layer, and also for reflecting light beams, the reflected light beams having wavelengths different from wavelengths of the light beams used for recording, erasing or playback of information to improve the appearance of the optical recording element;
wherein said optical thin film comprises a first thin film having a higher refractive index than that of said transparent substrate and a second thin film having a lower refractive index than that of said transparent substrate, said first and second thin films being alternately laminated.

12. An optical recording element according to claim 11, wherein the first and second thin films are respectively comprised of transparent dielectric thin films.

13. An optical recording element according to claim 11, wherein the respective refractive indices of said first and second thin films and the thickness of said thin films being a function of an integral multiple of a half-wavelength of a light beam.

14. An optical recording element according to claim 11, wherein the first thin film is made of ZnS and the second thin film is made of $MgF_2$.

15. An optical recording element according to claim 11, wherein the first and second thin films are respectively made of a combination of inorganic transparent dielectric materials, having refractive indices both lower and higher than said transparent substrate and composed of the group consisting of sulfide such as $Sb_2S_3$ and CdS; oxide such as $TiO_2$, $CeO_2$, $WO_3$, SiO, $Al_2O_3$ and $SiO_2$; fluoride such as $CaF_2$, LiF and NaF; nitride such as SiN and AlN; chloride such as $PbCl_2$.

16. An optical recording element comprising:
a transparent low-resistance substrate having an exposed surface and an internal surface, said substrate having a specified resistance at its surfaces thereof in the range from $0\Omega\cdot cm$ to $1\times 10^6 \Omega\cdot cm$;
a recording medium having a first surface and a second surface formed on said internal surface of the transparent low-resistance substrate, said internal surface being opposite to the side on which a light beam is incident;
a protective layer formed on said second surface of said recording medium, said second surface being opposite to the first surface facing the transparent low-resistance substrate; and
an optical thin film on said substrate opposite said recording medium, wherein said optical thin film comprises a first thin film having a higher refractive index than that of said transparent substrate and a second thin film having a lower refractive index than that of said transparent substrate, said first and second thin films being alternately laminated;
said optical thin film transmitting light beams used for recording, erasing and playback and reflecting light beams, the reflected light beams having wavelengths different from wavelengths of the light beams used for recording, erasing and playback.

17. An optical recording element according to claim 16, wherein said transparent low-resistance substrate comprises a transparent substrate and a coating layer.

18. An optical recording element according to claim 17, wherein said transparent substrate is made of glass.

19. An optical recording element according to claim 17, wherein said transparent substrate is made of plastic.

20. An optical recording element according to claim 19, wherein said plastic is made of polycarbonate resin.

21. An optical recording element according to claim 17, wherein said coating layer comprises a transparent conductive coating of a transition element oxide from the group consisting of $SnO_2$, $In_2O_3$ and CdO, and having a thickness in the range of 50 nm to 600 nm.

22. An optical recording element according to claim 16, wherein the transparent low-resistance substrate is of conductive glass including one or more oxides from the group consisting of $V_2O_3$, $WO_3$, $MoO_3$, $TiO_2$ and $Fe_2O_3$.

23. An optical recording element comprising:
a transparent substrate through which light beams pass having a first surface and a second surface;
a recording medium formed on said first surface of said transparent substrate; and
an optical thin film composed of at least one layer, formed on said second surface of said transparent substrate having an effective refractive index for transmitting light beams used for the recording, erasing and playback of information, and also for reflecting light beams, the reflected light beams having wavelengths different from wavelengths of light beams used for recording erasing or playback of information, so that the recording element has a colorful appearance.

24. An optical recording element according to claim 23, wherein said plastic is made of polycarbonate resin.

25. The optical memory element as set forth in claim 23, wherein said transparent substrate is made of glass.

26. An optical recording element comprising:

a transparent substrate through which light beams pass, having a first surface and a second surface;

an optical thin film having a lower surface and an upper surface, said optical thin film being composes of at least one layer and formed on said first surface of said transparent substrate for reflecting light beams, the reflected light beams having wavelengths different from wavelengths of the light beams used for recording, erasing or playback of information to improve the appearance of the optical recording element;

wherein said optical thin film comprises a first thin film having a higher refractive index than that of said transparent substrate and a second thin film having a lower refractive index than that of said transparent substrate, said first and second thin films being alternately laminated; and a recording medium formed on said upper surface of said optical thin film.

* * * * *